US006072587A

United States Patent [19]

Hicks

[11] Patent Number: 6,072,587

[45] Date of Patent: Jun. 6, 2000

[54] METHOD OF DETECTING POSITION ON A CONTINUOUS PRINT RECEIVING ELASTIC WEB

[75] Inventor: Michael S. Hicks, Huntington, Conn.

[73] Assignee: Accent Color Sciences, Inc., East Hartford, Conn.

[21] Appl. No.: 09/033,213

[22] Filed: Mar. 2, 1998

[51] Int. Cl.[7] .................................................... G06K 15/00

[52] U.S. Cl. ............................................ 358/1.5; 358/1.18

[58] Field of Search .................................... 358/1.1, 1.18, 358/1.5, 1.6, 1.12, 1.14, 498; 101/37, 181, 248; 399/165; 400/579; 226/21

[56] References Cited

U.S. PATENT DOCUMENTS 4,961,089 10/1990 Jamzadeh ................................ 355/207

*Primary Examiner*—Arthur G. Evans
*Attorney, Agent, or Firm*—Alix, Yale & Ristas, LLP

[57] ABSTRACT

A printing assembly has a moving web of print receiving material. A print positioning system has a coarse coordinate system and a fine coordinate system. Registration features on the web are used by a print positioning system to form the coarse coordinate system. The coarse coordinate system is employed to predict the location of the most recent registration feature. The fine coordinate system is re-synchronized to begin measuring from the location of the predicted registration feature.

19 Claims, 8 Drawing Sheets

METHOD OF DETECTING POSITION ON A CONTINUOUS PRINT RECEIVING ELASTIC WEB

FIELD OF THE INVENTION

The invention is directed to a printing apparatus and method of operation therefor to determine an accurate position on a print receiving web. More specifically, the invention is directed to a printing apparatus and method thereof for detecting registration features on a web of print receiving material to determine a printing position.

BACKGROUND OF THE INVENTION

It is known to use a second printer to print additional indicia on documents having previously received printing from a primary or host printer. The additional indicia can be, for example, color highlights printed onto black and white documents exiting high speed electrographic or xerographic printers. The preprinted documents are typically formed onto a continuous web of a print receiving material. The additional indicia are added onto the preprinted document at particular positions. Accurately positioning of the additional indicia relative to the preprinted materials is an important requirement of secondary printing. Additionally, for many printing environments, this accurate positioning of the additional indicia must be accomplished at a relatively high throughput rate in order to match or be synchronized with the throughput rate of the host printer. An example of a printing apparatus for the addition of color indicia to a pre-printed document is disclosed in U.S. patent application Ser. No. 08/552,798, entitled “A Printer Assembly”, which is incorporated by reference herein.

The secondary printer senses registration features formed in or on the web. The registration features allow tracking the web movement for accurate positioning of the additional indicia. These registration features can include top of form or registration marks printed by the host printer, or tractor feed holes positioned on the longitudinal edges of the web. The secondary printer senses a registration mark and synchronizes the print positioning system from the position of the registration marks. The printing positioning system is re-synchronized at the sensing of each new registration feature to continue to provide accurate positioning of the additional indicia.

Print positioning errors can arise when the registration features are damaged or missing. Furthermore, the print positioning system can interpret stray marks or other inconsistencies on the web as actual registration features. Re-synchronization of the print positioning system from these false registration features further degrades print position performance.

Furthermore, positioning errors can arise from the physical properties of the web. Print receiving web materials, most typically paper, can exhibit elasticity due to web tension, moisture content and thermal factors that affect actual document length, and therefore, print positioning. This elasticity of the web medium can result in either stretching or shrinking of the web in the process direction therefore resulting in variations of the distance between registration features.

The determination of web position must not only be performed accurately, but in real time at a rate commensurate with the high document output rates of many host printers. Prior print positioning systems are often incapable of implementation at the necessary throughput rates while simultaneously maintaining a high degree of accuracy for the print assembly.

SUMMARY OF THE INVENTION

Briefly stated, the invention is a printing apparatus and method of operation therefor wherein a plurality of registration features on the web are sensed. The sensed web features are then employed to predict the location of the subsequent registration feature. A fine printing position is then determined from the predicted position of the registration feature.

More particularly, the invention is a printing apparatus and a method of operation therefor to accurately position printed indicia onto documents having pre-positioned registration features. The positions of the registration features are sensed by an optical sensor. The absolute displacement of the web in the frame of reference of the printing assembly is directly sensed by an encoder. The positions of the registration features are employed to form a coarse coordinate system. A fine coordinate system measures from the coarse coordinate system to position the actual printing. The coarse coordinate system is used to periodically re-synchronize the fine coordinate system.

A position sensing system senses the geometry and position of web features formed in or on the web. Web features include registration features and all other features sensed on the web. The geometry and location of each of the web features is subject to preestablished parameters. The parameters are used in a filtering algorithm to determine which web features are suitable for use as registration features. The registration features are then employed for periodic re-synchronization of the print positioning system. The parameters are preferably a feature parameter related to the geometry of the web features and a web parameter related to the positions of the web features on the web 14.

In the preferred form of the invention, the length of each web feature, in the process direction of the printing apparatus, is measured. This measurement of the web feature is then compared to preestablished minimum and maximum values to eliminate or filter web features that fall outside the length parameters. The length parameters can be based on the geometry of the registration features and physical characteristics of the web material including elasticity.

Each web feature is then subject to a location parameter. In the preferred form of the invention, a location window is determined for which a valid registration feature is estimated to be positioned within. This location window is continuously adjusted based on both sensed and missing registration features. The location window is further preferably adjusted based on the physical characteristics of the web material including elasticity. The position window parameter eliminates web features that are substantially outside of the periodic positioning that are estimated for registration features. The web features that meet both the parameters for size and location are then categorized as true registration features suitable for re-synchronizing the print positioning system.

A set of the true registration features form the coarse coordinate system. The fine coordinate system is then registered from the coarse coordinate system. The fine coordinate system is used to precisely position the actual printing onto the document.

The fine coordinate system is re-synchronized from the predicted positions of the most recent registration features. The predicted position of the most recent registration feature is calculated from the set of positions of previously sensed registration features. The predicted position of the most recent registration feature can also be adjusted by the actual measured location of the most recent registration feature. The fine coordinate system, in other words, is re-synchronized on the predicted position of the most recent registration feature, in contrast to prior print positioning systems wherein re-synchronization of the print positioning is from the actual measured location of the registration feature most recently sensed. The method therefore allows for the continued prediction of position even when registration features are missing from the series. Furthermore, the use of a predicted position compensates for error in the sensing of the locations of the most recent registration features. Using a predicted position of the most recent registration feature allows for the efficient compensation for position sensing errors arising from web elasticity and other sensing variations that can occur during web motion.

It is an object of the invention to provide a printing apparatus and method of operation therefor to accurately position printed indicia onto a document at preselected positions.

It is a further object of the invention to provide a printing apparatus and method for operation therefor that compensates for elasticity in a print receiving web.

It is another object of the invention to provide a printing apparatus and method of operation therefor to position printing onto a document using predicted positions of registration features for print positioning.

It is a still further object of the invention to provide a printing apparatus and method of operation therefor to provide improved print positioning on documents having damaged or missing registration features.

These and other objects of the invention will become apparent from review of the specification and the drawings.

DESCRIPTION OF THE PREFERRED EMBODIMENT

Figure 1:
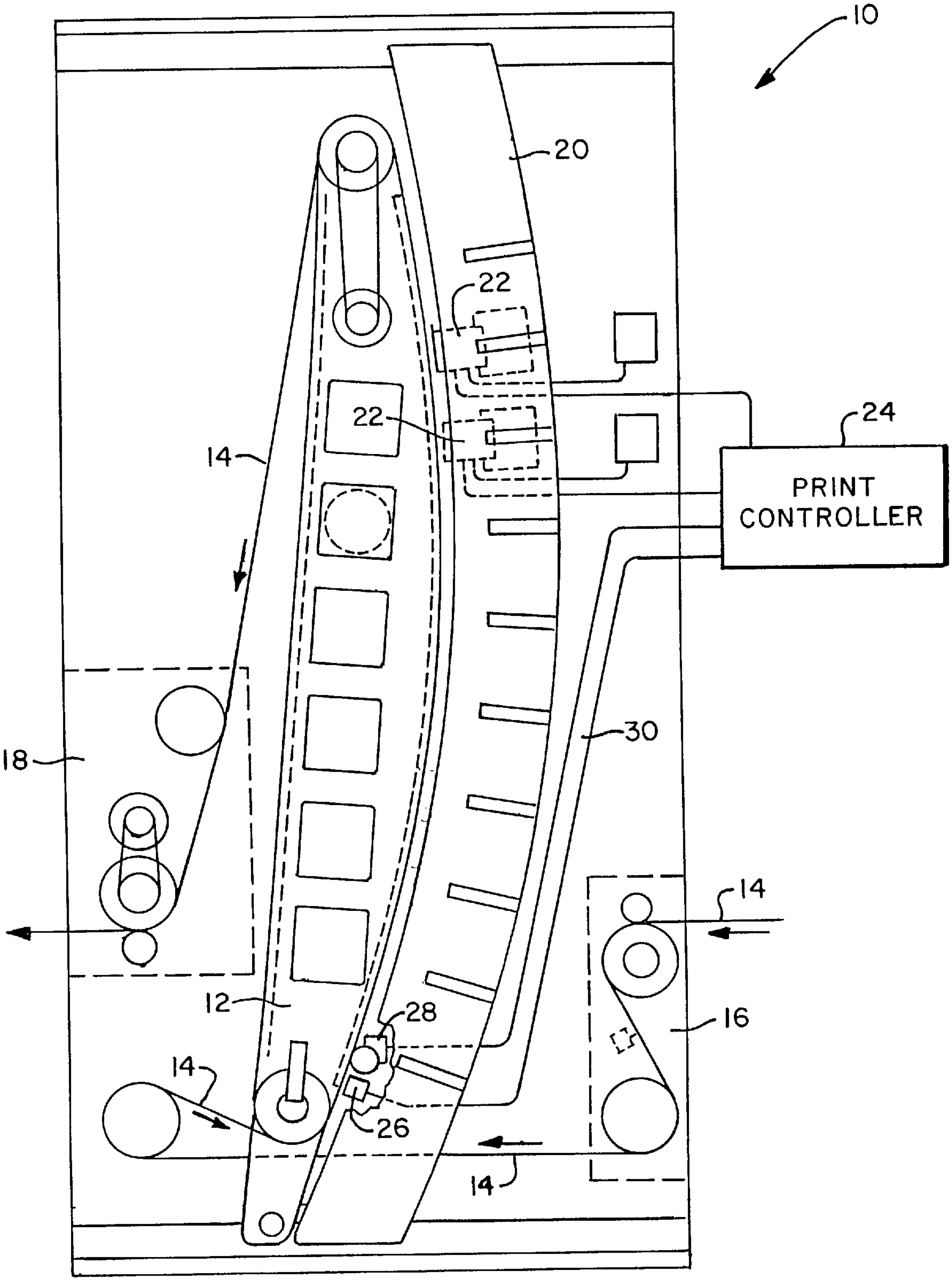
FIG. 1 is a plan view of a color accent printer and operable by a method therefor in accordance with the invention.
Figure 2:
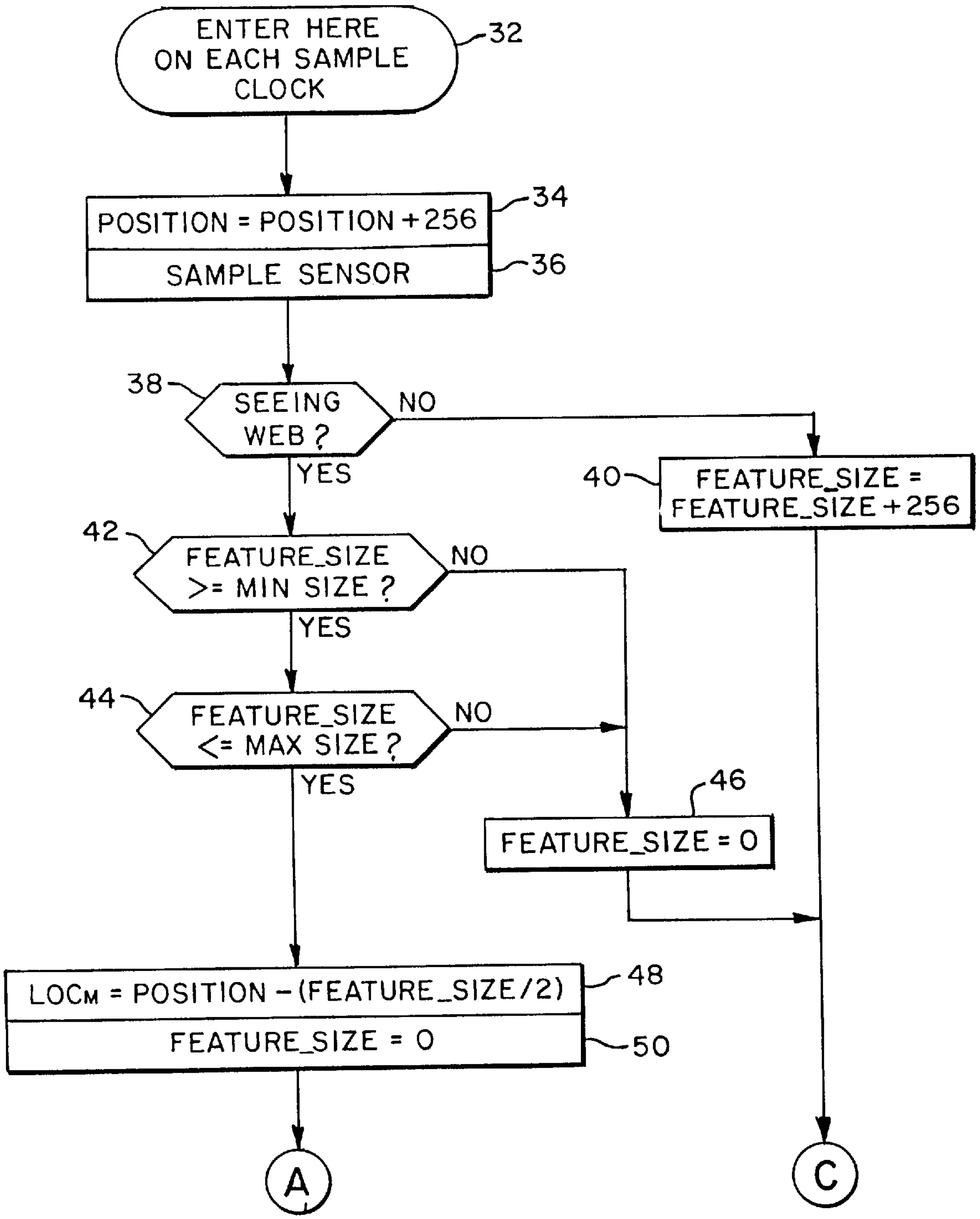
FIG. 2 is a partial diagrammatic representation of the method of the invention including web feature size constraint parameters.
Figure 3:
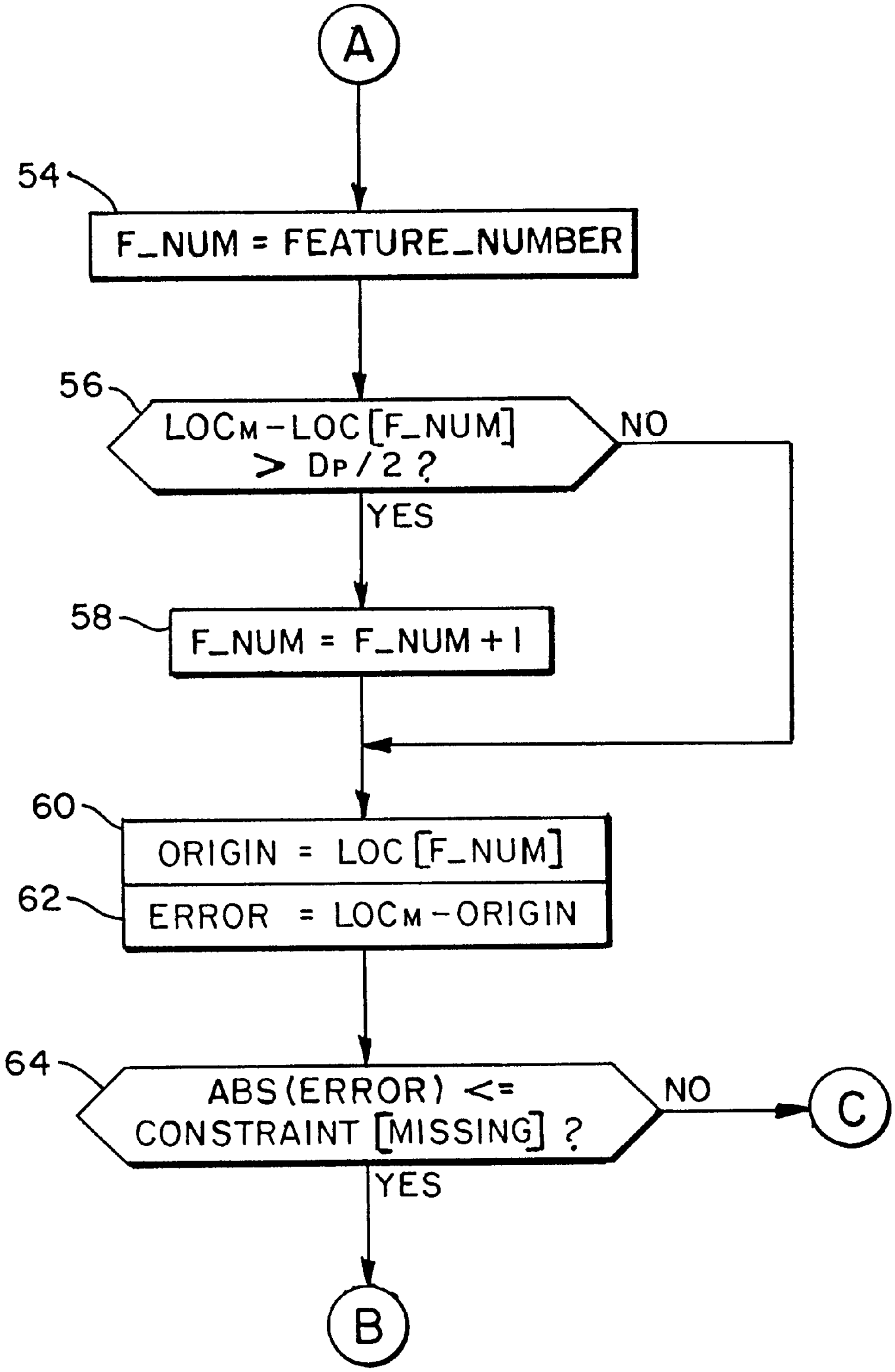
FIG. 3 is a partial diagrammatic representation continuation of the method from FIG. 2, including web feature location constraint parameters.
Figure 4:
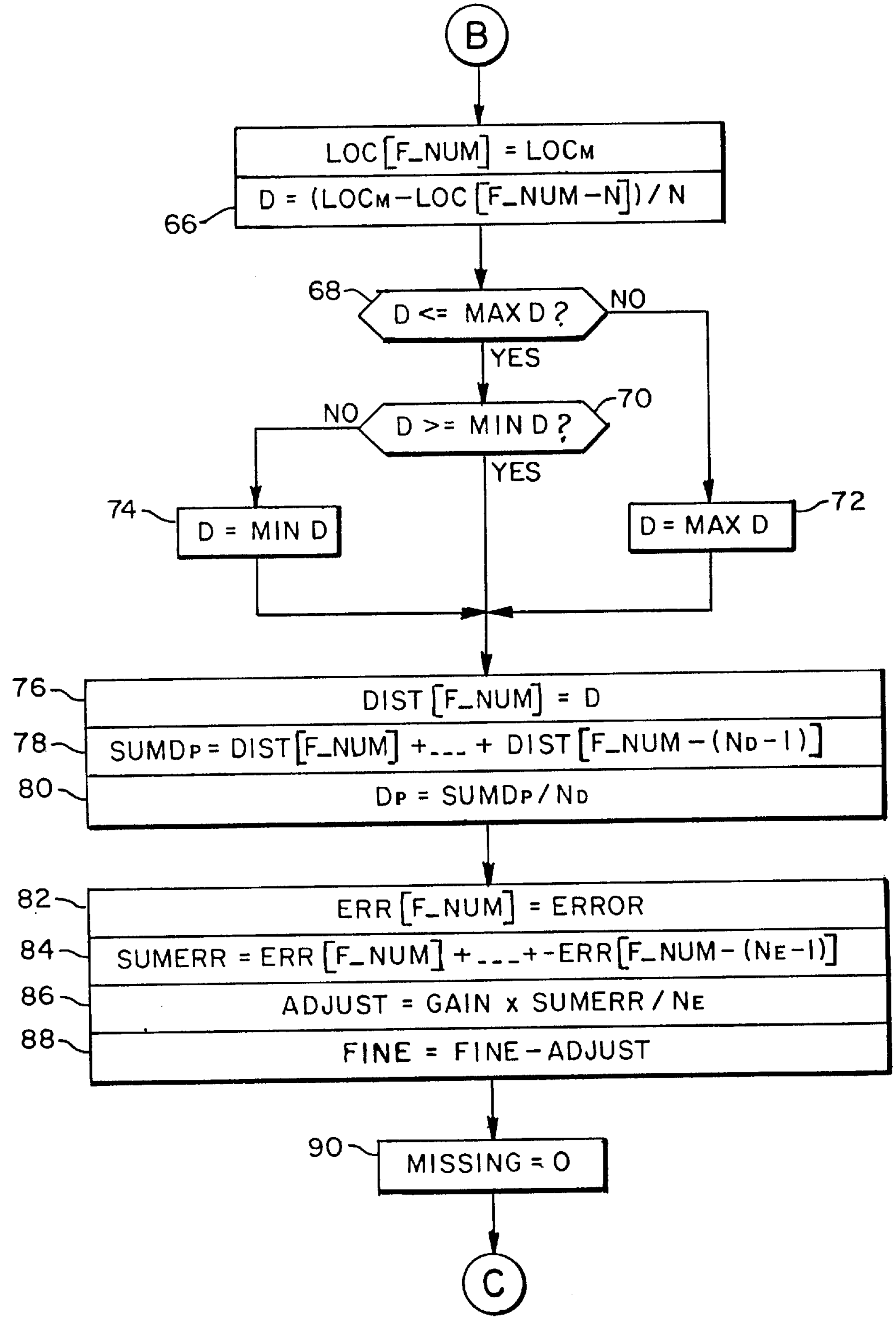
FIG. 4 is a partial diagrammatic representation continuation of the method from FIG. 3, including registration feature position parameters.
Figure 5:
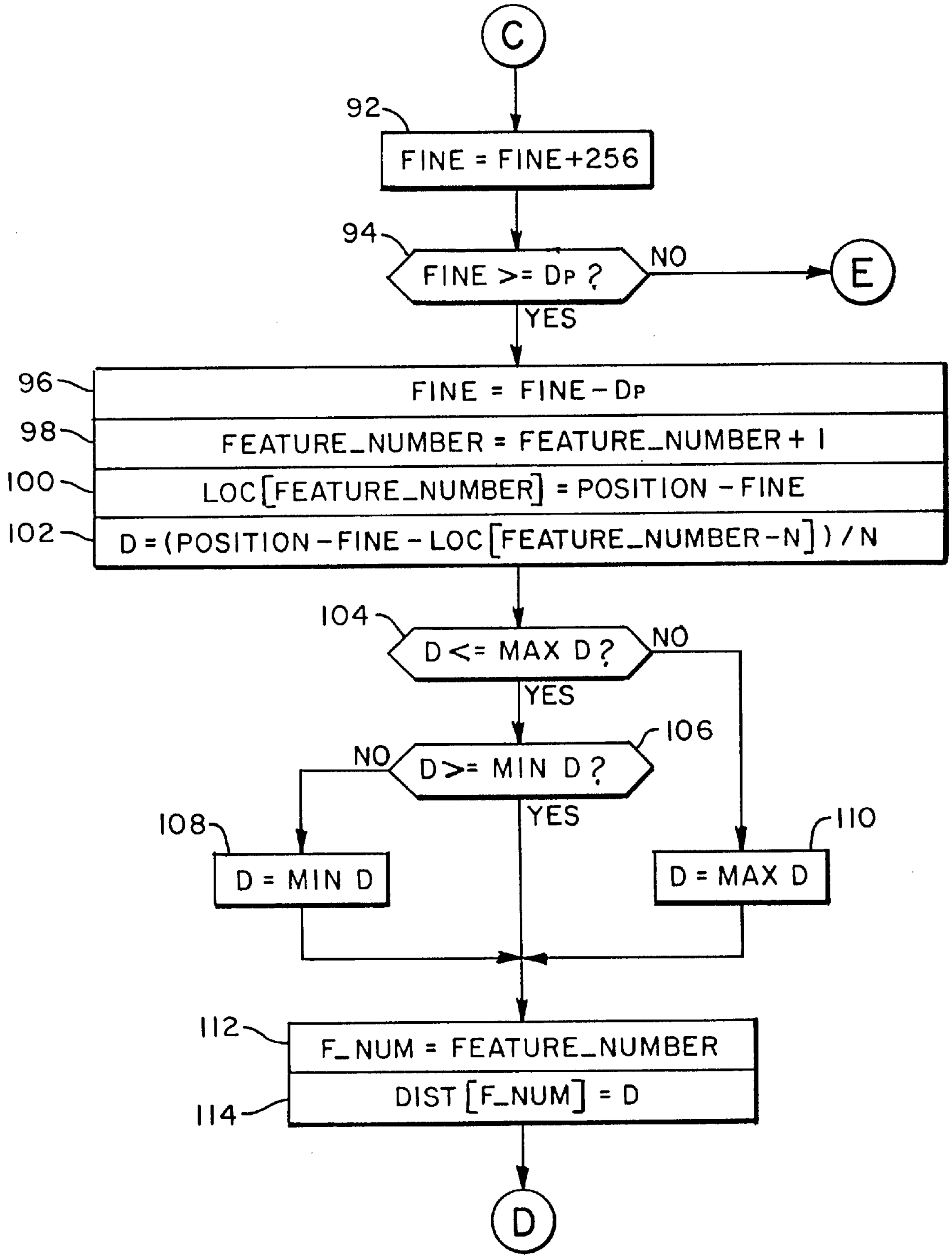
FIG. 5 is partial diagrammatic representation continuation of the method of FIG. 4, including re-synchronization of a fine coordinate system.
Figure 6:
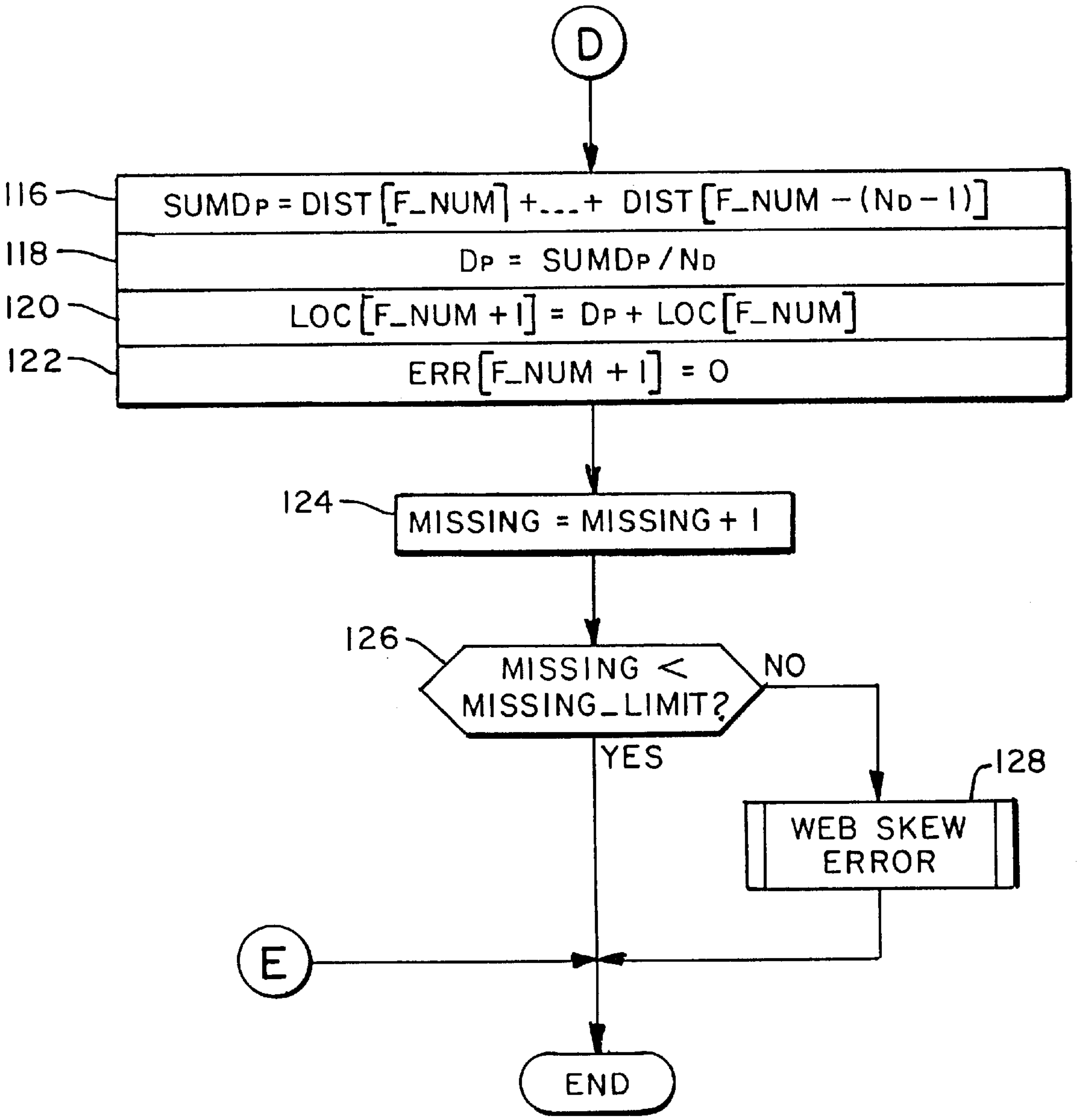
FIG. 6 is a partial diagrammatic representation continuation of the method of FIG. 5, including registration feature position prediction and missing registration feature counting.

With reference to FIG. 1, a printer assembly 10 in accordance with the invention and operable by the method therefor, has a curvilinear conveyor 12 for transport of a continuous web 14. The web 14 is a print receiving medium formed of a series of documents 13. The printer assembly 10 operates to add color indicia to pre-printed documents on the web 14. The web 14 is received from a high speed xerographic or electrographic printer (not shown). The conveyor 12 moves the web 14 in a process direction P past sequentially arranged print heads 22.

The medium of the web 14 is typically elastic, and therefore, exhibits longitudinal stretching or shrinkage due to tension, moisture content and/or heating during transport through the printer 10. Web materials include, but are not limited to, films, paper, plastics, textiles, transparencies, and other print receiving media. The web 14 has a series of preferably equidistantly spaced registration features. The registration features have a preestablished relationship to documents 13 on the web 14. For example, the registration features can indicate the top of form for each document. In another example, the web 14 can support generally equidistantly spaced tractor feed holes. The tractor feed holes have a known relationship to the pages or documents of the web 14 and can therefore be employed as registration features. The registration features and other non-features that can be sensed on the web are referred to as web features 15. Non-registration features can include tears or other damage to the web, ink blobs or other web inconsistencies.

The web 14 is directed onto the conveyor 12 by an input assembly 16 and removed from the conveyor 12 by an output assembly 18. A print head support 20 supports preferably multiple print heads 22 over the web 14 for printing thereon. The print heads 22 are controlled by a print controller 24. The print controller 24 can be a digital computer or other microprocessor-controlled apparatus. The print controller 24 determines where the print heads 22 are to print indicia onto the web 14 by use of an optical sensor 26 and an encoder 28. The optical sensor 26 and encoder 28 transmit signals over cables 30 to the print controller 24.

The optical sensor 26 is preferably a reflective-type proximity sensor capable of distinguishing the web 14 from the registration features. The print controller 24 employs the encoder 28 and optical sensor 26 for real time determination of web position in the frame of the reference of the web 14 by the prediction of the position of the most recent registration feature on the web 14. The encoder 28 has an encoder wheel in direct contact with the surface of the web 14 for precise tracking of the motion of the web 14 in the process direction P. The encoder 28 preferably generates a "tic" or signal indicating a single pixel width of movement of the web 14 in the process direction.

A web position can be represented as a coordinate pair of a coarse position and a fine position. The coarse coordinate system is defined by the registration features. The coarse position is employed to predict the position of the most recent registration feature. The fine position is a number of fine intervals from the predicted location of the most recent registration feature to a particular position on the web 14. The fine position is determined by the signal from the encoder.

The printer controller 24 employs the output of the optical sensor 26 and encoder 28 to run a position program 30. The position program 30 uses the output of the optical sensor 26 and encoder 28 to determine the web position for operation of the print heads 22. With reference to FIGS. 2–6, the position program 30 has an initial clock step 32 initiated by reception of a signal from the encoder 28. The clock step 32 is initiated by each pulse or encoder signal from the encoder

28. Each encoder signal is preferably equivalent to one pixel or scan line of movement of the web 14 in the process direction P. The position program has a preestablished printing resolution or pixels per unit distance (for example dots per inch, dpi). The position program 30 determines all positions, distances and lengths along the process direction P.

The position program 30 next performs a position step 34 whereby the current position is advanced by one pixel. A position value, stored in a position register for indicating an absolute position on the web 14, is advanced by 1 pixel as the web 14 moves one pixel width in the process direction P. The position program 30 preferably represents position, fine position and other linear dimensions in a fraction of a pixel width. These fraction of pixel widths are employed for calculating distances in the process direction P. In a printing assembly constructed in accordance with the invention, the position program 30 measures or calculates distances in the process direction in 1/256 of a pixel.

At a sample sensor step 36, the position program 30 samples the optical sensor 26. The position program 30 then at a web signal step 38 checks the preestablished output of the optical sensor 26 to determine if the optical sensor 26 is sensing the surface of the web 14 or a web feature 15. Registration features can be difficult to discriminate from other randomly occurring web features 15. In addition, registration features can be damaged or distorted, or even missing. Furthermore, the registration features may appear distorted due to performance limitations of the optical sensor 26. Therefore, the position program 30 applies a preestablished set of size and location parameters to each sensed web feature to discriminate registration features from non-registration features.

The optical sensor 26 can provide web feature data in either one or two dimensions. Optical sensors providing character recognition of two dimensional registration features can be used to measure with high accuracy the position of the registration feature in the process direction P. However, two dimensional character recognition systems typically have an increased cost, and furthermore, can be difficult to operate at the rate required in order to provide for timely high speed position determination. Therefore, it is preferred that the optical sensor 26 determine one dimensional data for the web features 15. The optical sensor 26 therefore provides a sensor signal to the position program 30 to be employed to determine a length measured in the process direction P of each web feature 15 passing the optical sensor 26. In the position program 30, when the optional sensor 26 fails to see the web 14, the position program 30 proceeds to feature size step 40. The feature size is stored in a feature size register. In feature size step 40 the value of the feature size in the feature size register is increased by one unit. One unit is the fraction of the preestablished pixel width, preferably 1/256th of a pixel. The program 30 continues to a coordinate system update section (described below). The position program 30 thereby establishes measured web feature size $S_M$. (See FIG. 7.)

When the optical sensor 26 senses the web surface 14 in the signal step 38, the position program 30 then applies preestablished size constraints or parameters to the measured web feature size $S_M$ of the sensed web feature 15. The size parameters are employed to distinguish registration features from non-registration web features 15. The size parameters are based on the characteristics of typical registration features. The size of a registration feature in the process direction can vary depending on several factors. One factor is the shape of the registration feature. A registration feature can have a feature size $S_M$ measured in the process direction P that varies depending on the tracking of the optical sensor 26. The optical sensor 26 can form different sensor tracks measured in the direction orthogonal to the process direction P. Therefore, the tracking of the optical sensor 26, in the direction orthogonal to the process direction P, can result in different feature size values $S_M$ for the same web feature 15.

Figure 7:
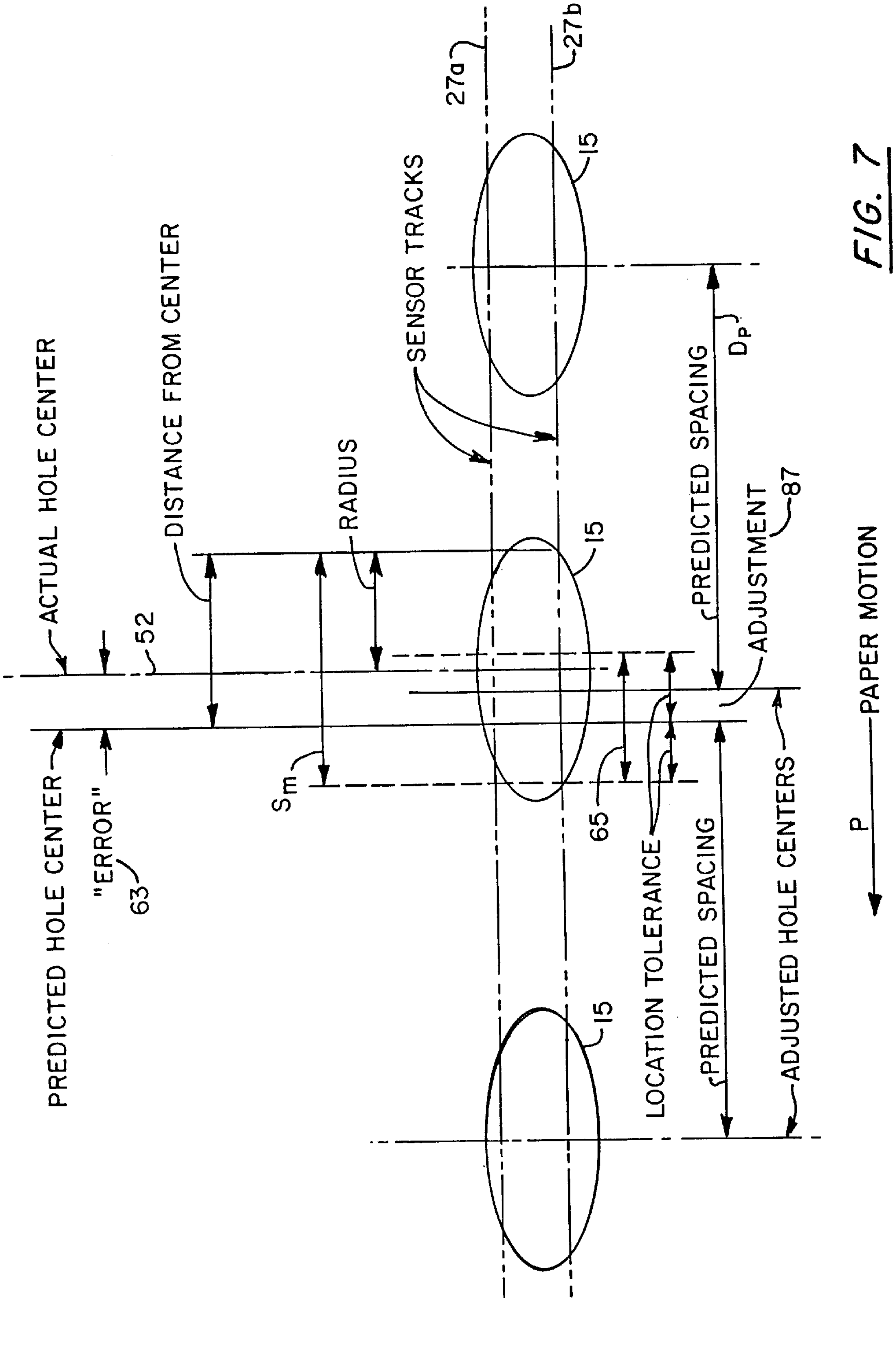
FIG. 7 is an enlarged schematic representation of the location measurement of a series of registration features.
Figure 9:
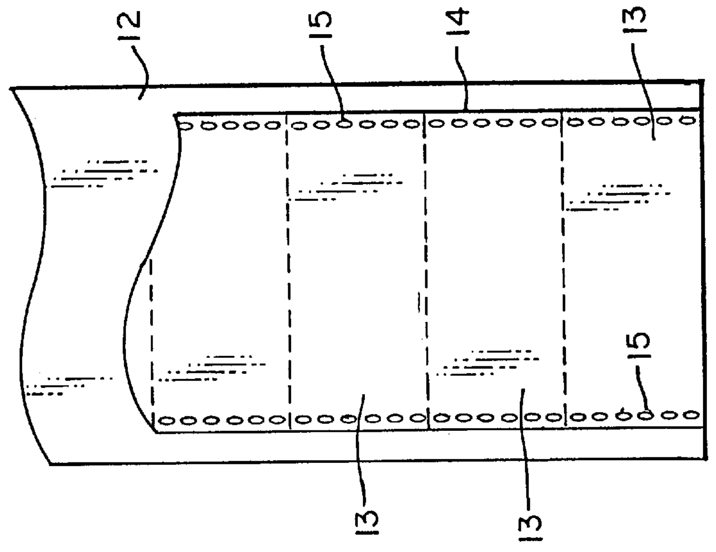
FIG. 9 is a side partially cut away view of the color accent printer of FIG. 1.

With reference to FIG. 7, having registration features of tractor feed holes, the optical sensor 26 can form a first sensor track 27a or second sensor track 27b. The sensor tracks, 27a, 27b sensed by the optical sensor 26 will depend on the positioning or registration of the web 14 orthogonal to the process direction P. The alternate sensor tracks 27a, 27b provide differing dimensional information for the same web feature 15. Each sensor track 27a, 27b will measure a different chord length across the tractor feed hole forming the registration feature. However, even though the chord lengths of sensor tracks 27a, 27b themselves may vary, for generally symmetrical registration features such as a circular tractor feed hole, the center line for either chord orthogonal to the process direction P will be in the same position. In other words, each of the chords which can be traversed by the sensor has the same mid point.

A preestablished parameter of a minimum feature size $S_{min}$ is applied to the measured feature size $S_M$ in a minimum feature size step 42 performed after signal step 38. The minimum feature size $S_{min}$ will be a preestablished fraction (1/R, where R=Ratio) of the theoretical maximum feature size $S_T$ of a registration feature. The following determination of the parameters for minimum and maximum registration feature sizes is discussed in terms of circular registration features such as tractor feed holes. The procedure for determining the parameters of minimum and maximum features sizes is equally applicable for registration features having other shapes or dimensions. The registration features are formed onto or into the web 14, which is itself typically formed of an elastic material. Therefore, any parameters for minimum and maximum feature size must account for the elasticity of the web 14. The parameters must also account for distortions in feature size that arise as a result of the sensing process. The maximum measured size $S_{max}$ in the representation of the one dimensional size due to the elastic properties of the web and the error introduced by the size sensing process is as follows:

$$S_{max}=S_T\times(1+LD_{max})\times(1+SD_{max})+AD_{max}$$

where, $S_M$ is the measured size of the registration feature;

$S_T$ is the theoretical size of the registration feature;

$LD_{max}$ is the maximum longitudinal distortion due to the elastic properties;

$AD_{max}$ is the maximum additive distortion introduced by the sensing process; and $SD_{max}$ is the maximum longitudinal distortion due to the sensing process.

The worst-case error can then be represented as $$S_{error}=S_{max}-S_T$$

$$=ST(LD_{max}+SD_{max}+LD_{max}+SD_{max})+AD_{max}$$

The maximum additive distortion $AD_{max}$ and longitudinal distortions $SD_{max}$ due to the sensing process are empirically determined for the particular optical sensor 26. The maximum additive distortion $AD_{max}$ is any distortion introduced by the sensing process, such as quantization error and uncertainty due to edge filters and debouncing. The maximum longitudinal distortion $SD_{max}$ is any distortion introduced by any magnification or demagnification effects in the sensing process. The maximum longitudinal distortion $LD_{max}$, arising due to the elastic properties of the web 14, will also be empirically determined for the particular material of the web 14. Both of the maximum longitudinal distortions $LD_{max}$ and $SD_{max}$ are typically symmetric about the center of the registration feature. Therefore, while the distortion $LD_{max}$ and $SD_{max}$ may impact the minimum or maximum size parameters, they will typically not introduce additional error into determination of the center of the registration feature.

For example, regarding registration features formed by tractor feed holes, the chord measured by the optical sensor 26 may be elongated or contracted, but the change in length of the chord is generally symmetrical about the center line. The maximum additive distortion $AD_{max}$ however, is asymmetric about the center of the observed registration feature. Therefore, the maximum additive distortion $AD_{max}$ does contribute to the error in the measured location of the center of the observed web feature 14. Therefore, the worst-case error in the measured location of a particular registration feature due to the sensing process is ½ the maximum additive distortion $AD_{max}$. Using the above-identified measured feature size $S_{min}$, the minimum feature size parameter for the measured feature size $S_M$ for the minimum size step 42 can be determined from:

$$S_{min}=(S_T/R)\times(1-LD_{max})\times(1-SD_{max})-AD_{max}$$

In the minimum size step 42, the position program 30 compares the measured feature size $S_M$ to the minimum feature size $S_{min}$.If the feature size $S_M$ is less than the above calculated preestablished minimum feature size $S_{min}$, the feature size register is reset to zero at a feature size reset step 46. The position program 30 then proceeds again to the coordinate system update section. If the measured feature size $S_M$ passes the first parameter of minimum size in the minimum size step 42, the measured feature size $S_M$ is then compared to a maximum feature size $S_{max}$ in the maximum size step 44. The maximum feature size $S_{max}$, using the above relationships, is determined by:

$$S_{max}=S_T\times(1+LD_{max})\times(1+SD_{max})+AD_{max}$$

If the measured feature size $S_M$ is greater than the maximum feature size $S_{max}$, again the position program 30 proceeds to the feature size reset step 46, whereby the feature size registered is reset to zero and the position program 30 can then proceed again to the coordinate system update section.

Once the measured feature size $S_M$ has met the parameters of both the minimum feature size $S_{min}$ and maximum feature size $S_{max}$ in steps 42 and 44, the feature location $LOC_M$ on the web can be determined. In a measure location step 48, the measured feature size $S_M$, and the position determined at the position step 34 are employed to determine the feature location in the following manner:

$$LOC_M=\text{Position}-(S_M/2)$$

The feature size register is then reset to zero at the feature size reset step 50 and the position program 30 can therefore again begin to determine the measured feature size $S_M$ of the next web feature 15.

The position program 30 next determines if the web feature just measured should be associated with the current registration feature or the subsequent registration feature. (See FIG. 3) At feature number step 54 the feature number register is set equal to the previous feature number. At a following feature determination step 56, the measured feature location $LOC_M$ registration feature is compared to the predicted location of the current registration feature. If the measured location is within an interval equal to ½ the predicted distance or expected spacing of registration features, the measured feature location $LOC_M$ is associated with the current numbered registration feature of feature number step 54. If the measured location is a distance greater than ½ the predicted distance or expected spacing between registration features, the measured feature is associated with the subsequent registration feature and the numbered feature is increased by one at a next feature number step 58.

The position program 30 then performs an origin step 60 wherein an ORIGIN is calculated. The ORIGIN is the predicted or expected position of the registration feature based on a predetermined set or array of the locations of a set of previously recorded measured or predicted registration features. Within the FIGS. 2–6, arrays are indicated by the use of brackets. Subsequently in an error step 62, an ERROR 63 is calculated by subtraction of the ORIGIN from the actual measured feature location $LOC_M$ determined in location step 48.

Therefore, the ERROR 63 is the difference between the predicted location of the registration feature ORIGIN and the actual measured feature location $LOC_M$. (See FIG. 7.) The absolute value of the ERROR 63 is then compared to a constraint array of pre-computed errors in a location constraint step 64.

The constraint array of the location constraint step 64 is pre-computed based on the elastic properties of the web 14 in conjunction with the number of previously missed registration features missed immediate to the current sensed web feature, the worst-case error in the measurement of the location of a registration feature and the worst-case tracking error permitted by the printing specification of the printing assembly 10. As the number of immediately missing registration features increases, the location constraint determined in the location constraint 64 is "relaxed" to allow for a greater range or window 65 in the acceptable location of a registration feature. (See FIG. 7) The relaxation of the window 65, or increase in the range of acceptable feature locations suitable for re-synchronization, is due to the increasing amount of prediction required to form the constraint array, and therefore, the increasing portion of error contained in the constraint array.

The fine coordinate system is based on the absolute displacement of the web 14 measured by the encoder 28 and is re-synchronized to the predicted location of each registration feature. The worst-case error then in determining location of a point of interest is:

$$\text{ERROR}=D\times LD_{max}$$

where,

D=Theoretical distance to a point of interest from registration feature; and $LD_{max}$=Maximum longitudinal distortion.

The smaller the distance between registration features, the shorter the length of the web 14 between registration features, and therefore the smaller the worst-case error in determining a particular point of interest. However, registration features can be missing or fail to meet the above-identified parameters for size or location. Therefore, the set of registration features suitable for re-synchronization of the fine coordinate system can be substantially reduced. The error for predicting the location of a point of interest then is given by:

$$\text{ERROR}=(M\times D_F+D)\times \text{LD}_{max}$$

where,

D=Theoretical distance to point of interest from registration feature;

$D_F$=Theoretical distance between registration features on the web;

$\text{LD}_{max}$=Maximum longitudinal distortion; and

M=Number of features missing since last re-synchronization.

The worst-case error occurs when the point of interest is the subsequent registration feature. Therefore, the theoretical distance D to the point of interest, can be substituted with the theoretical distance between the registration features $D_F$. The error for the predicted location of the next registration feature can then be expressed as:

$$\text{ERROR}=(M+1)\times D_F\times LD_{max}$$

Given the location of a particular registration feature, the location of subsequent registration features can be iteratively predicted:

Predicted Feature F+1 Location=(Feature F, $D_F$)

Predicted Feature F+2 Location=(Feature F, $2\times D_F$)

The greater the iteration required in the prediction of a location of a registration feature, the greater the error in the predicted location of the registration feature because the web 14 has longitudinal distortion due to its elastic properties. However, typically the longitudinal distortion of the web changes slowly, in other words, is nearly constant over distances on the order of a small number of registration features. Therefore, there is a distortion adjusted distance between adjacent registration features $D_P$ based on the current longitudinal distortion LD. The predicted location of a point of interest, i.e., where printing is to be positioned, can then be expressed as:

$$\text{Point of Interest Location}=(\text{Feature } F,\ (M\times D_F+D)\times(D_P/D_F))$$

where,

D=Theoretical distance to point of interest from registration feature;

$D_F$=Theoretical distance between registration features;

$D_P$=Distortion adjusted distance between registration features; and

M=Number of features missing since feature F.

The ratio of $D_P/D_F$ represents a correction factor incorporating the most recently observed longitudinal distortion, LD. The predicted location of a point of interest in terms of LD can be expressed by substituting:

$$D_P=D_F\times(1+LD);$$

into the immediately above determination of the point of interest to form:

$$\text{Point of Interest Location}=(\text{Feature } F,\ (M\times D_F+D)\times(1+LD))$$

To the first order, the error in the predicted location of a point of interest is reduced to zero. In actuality, the longitudinal distortion LD is not constant over short distances. Therefore, the maximum rate of change in the longitudinal distortion k that can occur per unit length of the web, can be employed. The parameter k is predetermined empirically and is dependent on the particular web material. The worst-case error in the distortion adjusted prediction due the change in longitudinal distortion is:

$$\text{ERROR}=k\int\int d^2L=\tfrac{1}{2}\times k\times L^2$$

where,

L=Length.

Evaluating the integral over the interval representing the length of the prediction, the worst-case error can be expressed as:

$$\text{ERROR}=\tfrac{1}{2}\times k\times[(M+1)\times D_F\times(1+LD)]^2$$

Using the above-formula and defining the rate of change in the longitudinal distortion k, to be less than or equal to the maximum rate of change in the longitudinal distortion $k_{max}$ expressed as:

$$k\leq k_{max},$$

the worst-case error in the position of a registration feature versus its predicted location is:

$$E(M)=\tfrac{1}{2}\times k\times[M\times D_F\times(1+LD_{max})]^2$$

A criterion for determining whether or not the use of a distortion adjustment is beneficial can then be established. The greatest rate of change in distortion per unit length that may be tolerated without causing error in the distortion adjusted prediction to exceed that which would result in the absence of a distortion adjustment is then $k_{max}$. Equating the above-identified formulas for the worst-case error with and without distortion adjustment and solving for $k_{max}$ results in:

$$(M+1)\times D_F\times LD_{max}=\tfrac{1}{2}k_{max}\times[(M+1)\times D_F\times(1+LD)]^2 LD\text{max}=\tfrac{1}{2}\times k_{max}\times(M+1)\times D_F\times(1+LD)^2 k_{max}=(2\times LD_{max})/[(M+1)\times D_F\times(1+LD)^2]$$

The criterion is dependent on the current distortion LD. The lower limit of the maximum rate of change of the longitudinal distortion $k_{max}$ can be computed by substituting the current longitudinal distortion LD with the maximum longitudinal distortion $LD_{max}$ to arrive at a determination which is independent of the current longitudinal distortion LD.

$$k_{max}=[1/(M+1)]\times(1/D_F)\times[(2\times LD_{max})/(1+LD_{max})^2]$$

The point at which the error in the predicted locations with and without distortion adjustment are equal can then be determined. The method of prediction of location of the subsequent registration feature can change at that calculated point to minimize overall the error in the predicted locations. An example is provided for an elastic web which exhibits the properties:

$$k=0.1\%/\text{in},\ D_F=8\text{ in},\ LD_{max}=3.0\%$$

Predictions without and with web distortion adjustment Comparison of Absolute Error (inches)

| M | $E(M) = M \times D_F \times LD_{max}$ | $E(M) = \tfrac{1}{2} \times k \times [M \times D_F \times (1 + LD_{max})]^2$ |
|---|---|---|
| 0 | 0.00 | 0.000000 |
| 1 | 0.24 | 0.033949 |
| 2 | 0.48 | 0.135795 |
| 3 | 0.72 | 0.305539 |
| 4 | 0.96 | 0.543181 |

-continued

| M | $E(M) = M \times D_F \times LD_{max}$ | $E(M) = \frac{1}{2} \times k \times [M \times D_F \times (1 + LD_{max})]^2$ |
|---|---|---|
| 5 | 1.20 | 0.848720 |
| 6 | 1.44 | 1.222157 |
| 7 | 1.68 | 1.663491 |
| 8 | 1.92 | 2.172723 |

With reference to the above-chart, the absolute error is significantly reduced for the first several registration features whose locations are being predicted by use of web distortion adjustment. However, the absolute error eventually increases to be greater than that which would have resulted had the predictions not been adjusted for web distortion. This result can occur because the current longitudinal distortion can be at one extreme and eventually change to the other extreme. For example, the current longitudinal distortion can change from the most constricted to the most extended. This change between extremes of longitudinal distortion results in a maximum change in distortion equal to twice the worst-case longitudinal distortion. Therefore, at the point in which the error in the predicted locations of a registration feature with and without distortion adjustment are equal, the error is minimized by changing from the distortion adjusted method of prediction of column 3, to the non-distortion adjusted method of prediction of column 2. Therefore, an overall minimization in the error of predicted locations can be achieved. The point of equality of the distortion adjusted and non-distortion adjusted methods of prediction $M_{spline}$ can be found by equating the above-formulas and solving for $M_{spline}$:

$$M_{spline} \times D_F \times LD_{max} = \frac{1}{2} \times k \times [M_{spline} \times D_F \times (1+LD_{max})]^2 M_{spline} = 2 \times LD_{max} / [k \times D_F \times (1+LD_{max})^2]$$

In the above-identified chart, $M_{spline}$ can be calculated to be 7.069 features. Therefore, in the above example, when predicting the location of registration features, once seven registration features have been missed, the worst-case error is reduced by reverting to a prediction without distortion adjustment.

Employing the point of equality $M_{spline}$, the worst-case error in the predicted location of a registration feature due to the elastic property of the web material as a function of the number of missing registration features immediate to the current sensed registration feature is given by:

$$E(M) = \frac{1}{2} \times k \times [M \times D_F \times (1+LD_{max})]^2 \text{ for, } M < M_{spline};$$

$$E(M) = M \times D_F \times LD_{max}) \text{ for, } M > M_{spline};$$

where, $D_F$ is the theoretical distance between registration features;

k is the maximum rate of change in distortion for unit length for the web;

M represents the number of features missing since the last re-synchronization;

$LD_{max}$ is the previously discussed maximum longitudinal distortion; and $M_{spline}$ is the point at which the error in the predicted locations of registration features with and with distortion adjustment are equal.

In addition to the error introduced by the elastic properties of the web in determining the window 65 of the location constraint, the absolute error in the predicted location of a particular registration feature is also dependant upon the current re-synchronization error or position tracking error $E_R$. In determining the location constraint array, the worst-case position tracking error $E_{max}$ is defined as equal to the position tracking performance specification of the printing assembly 10. Furthermore, in defining a location constraint, the worst-case error in the measurement of the true location of a web feature $E_M$ must also be considered. The worst-case error in the measurement of the true location of a web feature can be expressed as:

$$E_M = (E_A + AD_{max})/2$$

where, $AD_{max}$ is the maximum additive distortion discussed above; and $E_A$ is the maximum asymmetric error due to the shape characteristics of the registration feature.

Figure 8:
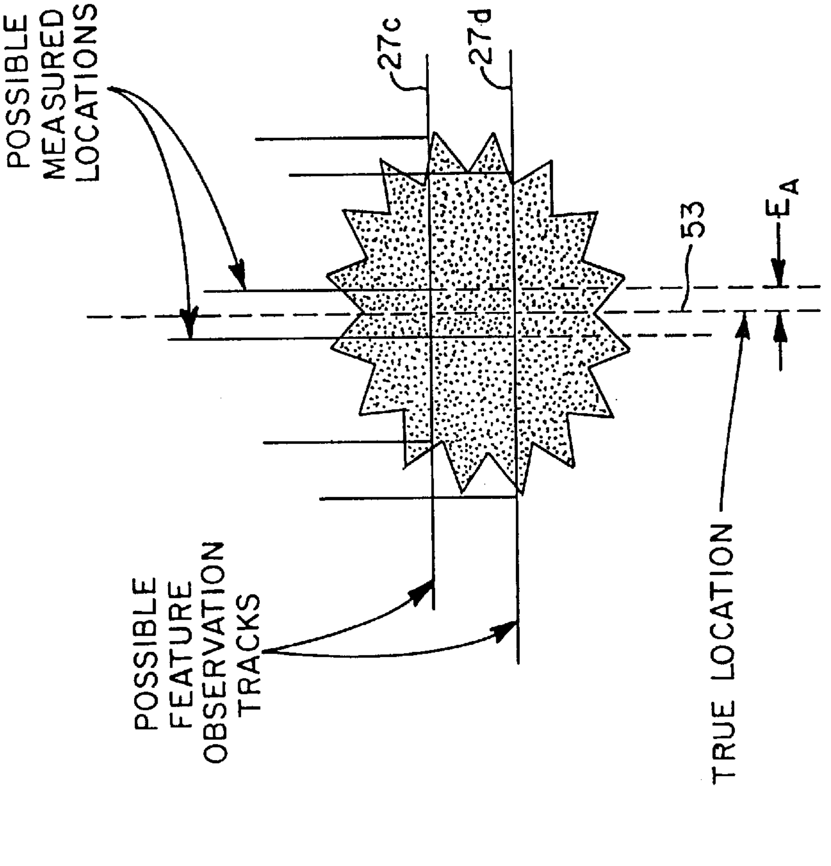
FIG. 8 is an enlarged schematic representation of the location measurement of an irregular registration feature.

An asymmetric registration feature, such as a tractor feed hole having starred edges can further increase the error in determining the true location 53 of the registration feature. The sensing tracks 27*c*, 27*d* of the optical sensor 26 can be shifted by the irregularities of the serrations in the direction orthogonal to the process direction. (See FIG. 8) The chords measured by the different sensor tracks 27*c*, 27*d* have different chord centers, thereby shifting the measured location of the registration feature. The worst-case difference in the measured location of a registration feature and the predicted location of a registration feature is the sum of the three sources of error and is expressed as:

$$E_L = E_{max} + E_M + E(M)$$

where, $E_{max}$=worst-case tracking or re-synchronization error;

$E_M$=worst-case error in the measurement of the true location; and

E(M)=worst-case error in predicted location.

The above equations can therefore be combined to express the location constraint as follows:

For $M < M_{spline}$, $$|LOC_m - LOC_p| \leqq E_{max} + (E_A + AD_{max})/2 + k/2 \times [M \times D_F \times (1+LD_{max})]^2$$

For $M \geqq M_{spline}$, $$|LOC_m - LOC_p| \leqq E_{max} + (E_A + AD_{max})/2 + M \times D_F \times LD_{max}$$

where, $AD_{max}$ is the maximum additive distortion introduced by sensing process $D_F$ is theoretical distance between registration features $E_A$ is the maximum error in the measured location of a registration feature due to the shape characteristics of a registration feature $E_{max}$ is the worst-case re-synchronization error k is the maximum rate of change in distortion per unit length $LD_{max}$ is the maximum longitudinal distortion $LOC_m$ is the measured location of the observed feature $LOC_p$ is the predicted location of the corresponding registration feature M is the number of features missing since last re-synchronization $M_{spline}$ is $2 \times LD_{max} / [k \times D_F \times (1+LD_{max})^2]$ It is important to recognize the incorporation of the number of immediately previously missing features into the calculated location constraint. The location constraint is made less stringent, i.e., the window 65 is relaxed, as the number of immediately previously missed registration features M increases. As the web 14 proceeds farther from the last detected registration feature, the component of error due to the elastic properties of the web 14 increases. Therefore, as defined in the location constraint formula above, the location constraint is relaxed at the worst-case rate at which the error due to elastic properties of the web may increase. Relaxation of the location constraint assures that any valid registration feature will satisfy the location constraint. Otherwise, valid registration features may be excluded from the set, increasing the error because re-synchronization is delayed or precluded altogether.

If the measured feature location $LOC_M$ is within the location constraint imposed in step 64, the position program 30 designates the web feature as a registration feature and performs a re-synchronization of the fine coordinate system. If the measured location feature for the web feature is outside of the location constraint, the position program 30 proceeds to the coordinate system update section.

An algorithm is then employed to compute the current distortion adjusted distance between registration features $D_P$ and to measure the current tracking error $E_R$. The distortion adjusted distance $D_P$ and tracking error $E_R$ are calculated from the data set of registration features generated by the above identified filtering of all web features observed, the filter being the applied parameters of the feature size and the location constraint.

The registration feature set $\Im$ is defined as the set of the measured locations of the most recent number of registration features N and the measured location of the most current observed registration feature, and is defined as:

$$\Im=\{L_0+\epsilon_0, L_1+\epsilon_1, \ldots, L_{N-1}+\epsilon_{N-1}, L_N+\epsilon_N\}$$

where, $L_X$ is the actual location of a registration feature; and $\epsilon_X$ is the error in the measured location of a registration feature.

Missing registration features or registration features excluded because they fail to meet either the size or location parameters are substituted with manufactured features. The manufactured feature is the predicted location of the missing registration feature. That is, the feature set is completed by employing the predicted feature locations where an actual registration feature has not been detected, or the registration feature failed to meet the size and location parameters. By definition, the worst-case error of the predicted or manufactured feature is simply the worst-case error predicted. Therefore, the worst-case prediction of error for a manufactured feature is given by $E_L-E_M$. The magnitude of the worst-case error is then quantified for each member of the registration feature set.

Qualitatively, the error must be examined to determine how poor the resulting print quality can be before they fall outside the parameters for acceptable printing quality. A large number of successive damaged features, all whose actual measured locations exhibit the same magnitude of error in the same direction, gives the largest possible error. Typically, however, within the tolerance of a performance specification for the printing assembly 10, there are restrictions on the quality of the web material that can be guaranteed to be processed successfully. The qualitative examination considers the types of web features that will be sensed as registration features, and their general frequency of occurrence.

Typically, the vast majority of observed features which satisfy both the feature size and feature location constraints, are what can be described as true registration features. A true feature is a registration feature whose measured location contains only the expected asymmetric error due to the sampling process ½ $AD_{max}$ and the asymmetric error due to the shape characteristics of the registration feature ½ $E_A$.

In addition, registration features can be damaged. A damaged feature is a registration feature whose location information contains asymmetric error due to damage or distortion. In the case of tractor feed holes, the damage or distortion can include rips or tears that enlarge the hole and therefore distort the measured location. Additionally, damage or distortion can include material that partially occludes the opening. This occluding of the registration feature distorts the sensing of the actual feature location.

A third possible form of a registration feature are false features. False features are not actual registration features at all on the web 14, and yet satisfy the feature size and feature location constraints imposed. False features can include drops of ink or other material adhering to the web 14. Given typical operating constraints on a printing apparatus, false features are a relatively rare occurrence, and their error is merely the worst error that can exist and still fall within the location constraint applied to all registration features. The frequency of each of the different types of registration features effects the ability to maintain print positioning within preestablished quality parameters.

Missing features occur at a great enough frequency so as to be considered commonplace. Generally, damaged features occur in isolated groups of one or more successive features. The amount of damaged features that can be successfully processed while still maintaining a high quality of print positioning are again based upon the print positioning performance criteria expected for the printing apparatus. The characteristics of the web material and the processing which typically occurs prior to the sensing of the registration features allow a limit to be specified on the number of successive damaged features that the printing apparatus can tolerate while still providing printing within the preestablished quality parameters. False features, due to their relatively low probability, typically only occur as single events, and therefore typically do not have a substantial effect upon print positioning.

After a web feature meets the location constraint of location constraint step 64, the position program 30 proceeds to an average distance step 66. In the average distance step 66, the average distance between each adjacent registration feature of the array is computed. In particular, the location of the last or most distant registration feature of the array is subtracted from the location of the most recently measured registration feature. The total is then divided by the number of registration feature intervals in the array (N+1 features form N intervals).

An important determination for accurate print positioning is the number of registration features that will be employed in determining the average distance between adjacent registration features. More particularly, the total distance between the most recent and most distant registration features will effect print positioning error. The larger the number of registration features employed in the array, the smaller the effect the error in the measured location of a single registration feature will have on the computed average distance between adjacent registration features. However, as the size of the array increases, registration features increasingly farther away from the current position are included. However, if a very large number of registration features are employed, the resulting average distance between adjacent registration features lacks immediacy. In other words, the resulting average distance between registration features fails to reflect what is immediately occurring with the web 14, in particular, with elasticity of the web 14 at the actual printing location. Therefore, these two concerns of reduced error and immediacy of web condition must be balanced. The greater the rate of change in the elasticity in the web 14, the smaller the number of registration features that can be employed to give an indication of the condition of the web at the printing location. The lesser the rate of change in the elasticity in the web, the greater the number of registration features that can be employed, and the smaller the error. Therefore, increasing the number of registration features included in the set decreases the immediacy of the data and degrades the measurement of the actual elasticity condition of the web 14 in any moment.

The number of registration features included will typically require empirical study to determine the optimal number of registration features for the total length of web 14 being analyzed to provide improved printing quality. In one printing assembly constructed in accordance with the invention, 16 registration features or tractor feed holes having an average spacing of ½ inch on a paper web have been found to provide an adequate balance of reducing error and indicating the immediate elastic condition of the web 14.

The average distance between the registration features of the array calculated at step 66 is then subject to the worst-case values due to the physical properties of the web 14. In other words, the average distance between the registration features of the array cannot be greater than the theoretical distance between the registration features on the web under maximum stretching or elongation. Furthermore, the average distance between the registration features of the array cannot be less than the theoretical distance between registration features that would occur under the greatest shrinkage or contraction of the web 14. Therefore, the average distance between the registration features of the array can be no less or no greater than the absolute limits imposed by the physical properties of the web 14. The absolute limits due to the physical properties of the web are determined by:

$$D_F \times (1-LD_{max}) \leq D_P \leq D_F \times (1+LD_{max})$$

At an elongation limit step 72, if the average distance or predicted distance D between registration features of the registration feature array is greater than the maximum elongation distance computed above, the predicted distance D is set to the maximum value. If the average distance or predicted distance D between registration features of the registration feature array is less than the minimum contraction distance computed above, the predicted distance D is set to the minimum contraction distance at a contraction limit step 74. The result of the elongation limit step 72 and contraction limit step 74 is a distortion limited measured distance between adjacent registration features D. The distortion limited distance D is then saved into the registration feature measured distance array in the distortion limited distance storage step 76.

A sliding average of the measured distance between registration features is then computed for the $N_D$ most recently measured registration features $N_D$. The number of the most recently measured registration features ND whose distances are incorporated in the average will be a sub-set of the total number of registration features N of the registration feature set. In a sliding average summation step 78, the distances associated with the $N_D$ most recent registration features are summed. The resulting sum of the sliding average summation step 78 is divided by $N_D$ in averaging step 80. The number of registration features in $N_D$ incorporated in the average will be empirically determined based upon the properties of the particular web material. In one printing assembly constructed to embody the invention, $N_D=4$ to provide an accurate indication of the web condition. The average computed in the averaging step 80 is described as the distortion adjusted distance $D_P$ and is the distance from the prediction predicted location of the current registration feature used in the prediction of the location of the subsequent registration feature.

In the next portion of the position program 30, the current tracking error is calculated. The current tracking error is computed in order to adjust the prediction of web position based on the differences between the measured locations and the predicted locations of the registration features comprising the registration feature set. The tracking error is based upon the qualitative understanding that the registration feature set contains substantially all true features, a lesser number of manufactured features filling in for missing features, and a very limited number of troublesome features, including damaged or false features. The sources of error in the measurement of true feature locations are random in their occurrence, and therefore, exhibit a normal probability distribution. As a result, the effects of the errors of the true features are minimized by averaging the locations of the registration features. For large numbers of true registration features, the resulting error is substantially zero when averaged. Therefore, the average of the differences between the measured locations and the predicted locations of the registration features is representative of the tracking error $E_R$.

The errors between the measured locations and the predicted locations of the registration features of the registration feature set are summed in an error summation step 84. The summation of the errors calculated in the error summation step 84 are averaged by dividing the sum by the number of registration features $N_E$ in a calculated adjustment step 86. The average of the errors is multiplied by the gain (defined below) to provide an amount of adjustment 87 of the predicted position of the just past registration feature. (See FIG. 7.)

However, it is important not to adjust the web position based on erroneous information. Therefore, from the maximum rate of change k in the longitudinal distortion due to web elasticity and distortion, the effect that a worst-case change in the longitudinal distortion would have on the position of the next feature can be computed. In the next portion of the positioning program 30, the web position is adjusted based on the error computed in the error step 62 and now stored in error step 82.

The position program 30 adjusts for the error due to the elastic properties of the web 14, and also due to the re-synchronization error. The measured tracking error is indicative of the direction and magnitude of the position error. However, the measured tracking error can include erroneous information due to manufactured registration features, false features, etc. When re-synchronizing the current position, the position program 30 should not over compensate for the erroneous position information. The measured tracking error, limited by an amount dependent on the maximum rate of change of the longitudinal distortion k, is useful as the indicator or suggestion of the direction to adjust the predicted position of the registration feature. The limit is defined as the gain and can be expressed as:

$$\text{Gain} = \tfrac{1}{2} \times k \times D_F^2$$

The greater the gain, the greater the reaction of the position program 30 in the adjustment of the prediction of the location of the next registration feature to erroneous information introduced by measurement difficulties. A gain of the position program 30 that is too great results in the prediction continuously underestimating and overestimating the location of the next registration feature and therefore providing erratic estimates and reduced print positioning quality. However, should the gain of the position program 30 be too low, then the reaction of the predicted position of the next registration feature to expected changes in the longitudinal distortion can be insufficient. Therefore, the predicted position may never reach or catch the measured locations of the subsequent registration features. The location predictions will continuously lag or lead the actual measured location and result in continuing errors in printing positioning.

The gain is usually determined empirically based on the performance specification for a particular print assembly 10 and properties of the web materials. Typically, the gain is relatively small compared to one pixel. Usually distortion changes are sufficiently low wherein the preferred gain is less than one pixel. Therefore, multiplying the measured tracking error by the maximum error due to the distortion changes provides the amount of adjustment necessary for the predicted location of the registration feature.

In an adjust location step 88, the fine coordinate system is changed by the adjustment amount calculated in the calculated adjustment step 86. Next, the missing feature register is set to zero in a reset missing reference feature step 90. The missing feature register is set to zero because the most recent reference feature was actually measured and the fine coordinate system was re-synchronized.

The position program 30 next proceeds to a feature prediction section. In steps 100–118, the arrays used in the position program 30 are initialized based on the current state of the program variables, thereby manufacturing the set of information associated with the predicted registration feature with the advancement of the coarse coordinate system. In a predicted location step 100, the location of the predicted feature is initialized to the current position minus the fine coordinate value. The location of the predicted feature produced in the predicted location step 100 is then used in the determination of a new average distance D between registration features in computation step 102.

The average distance D computed in the computation step 102 is then subject to the minimum and maximum position prediction case distances possible due to the physical properties of the web. As indicated above, the average distance D between registration features is compared to the maximum distance $D_{max}$ between reference features based on the elasticity of the web 14 in a maximum comparison step 104. If the calculated average distance D is greater than the maximum distance $D_{max}$, the average distance D is set equal to maximum distance $D_{max}$ at an equate to maximum step 110. Similarly, the average distance D between registration features computed in the position prediction step 102 is compared to the minimum distance $D_{min}$ between registration features based on the elasticity of the web 14 in a minimum comparison step 106. If the average distance D between registration features is less than the minimum distance $D_{min}$, the average distance D is set equal to the minimum distance $D_{min}$ in an equate to minimum step 108. The distance D subjected to the minimum and maximum values based on web properties is then used to initialize the average distance array at the index corresponding to the predicted registration feature.

Steps 116 and 118 compute a new distortion adjusted distance $D_P$ as discussed above. The computed predicted distance $D_P$ is then employed to predict the location of the next registration feature in a subsequent feature prediction step 120. The error or difference in the measured location and predicted location of the subsequent registration feature is initialized to zero in zero step 122. In the missing features step 124, the missing feature register is increased by one because the current registration feature has not as yet been measured. In the missing features limit step 126, the value of the missing feature register is compared to the limit determined wherein missing more than the predetermined number of registration features results in printing position determination of such low quality that the printing procedure is interrupted in web error step 128. The point at which the coarse coordinate system fails is where the worst-case error in the predicted location of a registration feature has increased to half the theoretical distance between two registration features. In other words, the worst-case error is so great that all points on the web 14 are within the window 65 and no web feature position is excluded. The maximum number of missing features, $M_{max}$, in the case where distortion adjustment is not employed, can be determined as:

$$½ \times D_F = ½ \times k \times [M_{max} \times D_F \times (1+LD_{max})]^2;\ \text{and solved to provide:}$$

$$M_{max} = 1/(2 \times LD_{max})$$

Similarly, where distortion adjustment is employed can be determined:

$$½ \times D_F = ½ \times k \times [M_{max} \times D_F \times (1+LD_{max})]^2$$

$$M_{max} = 1/\{k \times D_F \times [1+LD_{max}]2\}^{1/2}$$

$$M_{max} = [1/(k \times D_F)]^{1/2}/(1+LD_{max})$$

Using the example provided in the chart above, $M_{max}$= 16.67 features, when distortion adjustment is not used, and $M_{max}$=10.85 features, when using distortion adjustment. If the missing number limit of the missing feature limit step 126 is not met, the position program 30 exits to await the next signal from the encoder 28.

The position program 30 has the particular advantage of implementation to provide real time position determination on webs having high throughput rates while maintaining a highly accurate level of print positioning.

While preferred embodiments of the present invention have been illustrated and described in detail, it should be readily appreciated that many modifications and changes thereto are within the ability of those of ordinary skill in the art. Therefore, the appended claims are intended to cover any and all of such modifications which fall within the true spirit and scope of the invention.

What is claimed is:

1. A method of detecting position on a continuous print receiving elastic web for use in a printing assembly having a moving print receiving elastic web and a plurality of spaced registration features thereon, means for printing indicia on the web, means for sensing registration features on the moving web, wherein at least some said registration features may be missing or damaged, a print positioning system defining a coarse coordinate system consisting of the positions of sensed registration features meeting size and location parameters and a fine coordinate system derived from said coarse coordinate system, said print positioning system utilizing said fine coordinate system to synchronize the actuation of said means for printing with the movement of said web, whereby said indicia are deposited in a particular location on said web, the method comprising:

calculating a predicted position on the web for each registration feature from the set of registration feature positions making up the coarse coordinate system, and utilizing said predicted registration feature position to update said fine coordinate system.

2. A method for determining a fine printing location on a moving web, the web having a plurality of substantially regularly spaced web features, wherein at least some of said web features may be missing or damaged, the method comprising:

(a) moving the web on a transport path in a process direction;

(b) sensing for web features on the moving web;

(c) applying a predetermined feature parameter to said sensed web features to determine a set of registration features;

(d) applying a predetermined web parameter to said sensed registration features to determine a sub-set of registration features;

(e) calculating a predicted registration feature location for a subsequent registration feature from the locations of said sub-set of registration features; and (f) determining a fine printing location from said predicted registration feature location.

3. A method for determining a fine printing location on a moving web for printing thereon, the web having a plurality of substantially regularly spaced web features, wherein at least some said web features may be missing or damaged, the method comprising:

(a) moving the web on a transport path in a process direction;

(b) defining a size parameter for sensing a registration feature, said size parameter defining a limitation of size of a sensed web feature in terms of a distance travelled in the process direction;

(c) defining a position parameter for sensing a registration feature, said position parameter defining the limitation of position of a sensed web feature in terms of a distance travelled in the process direction;

(d) sensing for a plurality of web features on the moving web;

(e) applying said size and said location parameters to said sensed web features to define a plurality of measured registration features;

(f) determining a process directional position for each measured registration feature;

(g) calculating a predicted registration feature position from the positions of said measured registration features;

(h) determining a fine printing location on said web from said predicted registration feature position;

(j) printing on said web at said fine printing location.

4. The method of claim 3 wherein the limitation of size is a minimum distance in the process direction for a registration feature.

5. The method of claim 4 wherein the web is elastic and said minimum distance is dependent on the elastic contraction of the web.

6. The method of claim 3 wherein the limitation of size is a maximum distance in the process direction for a registration feature.

7. The method of claim 6 wherein the web is elastic and said maximum distance is dependent on the elastic elongation of the web.

8. The method of claim 3 wherein said determining said process directional position comprises determining the mid point of the registration feature.

9. The method of claim 3 wherein said calculating a predicted registration feature position from the positions of said measured registration features comprises:

(i) calculating an average distance between measured registration features;

(ii) determining said predicted position from said average distance.

10. The method of claim 9 wherein said web is elastic and said calculating a predicted registration feature position from the positions of said measured registration features further comprises:

(iii) predetermining an average distance parameter based on web elasticity having a maximum average distance and a minimum average distance;

(iv) applying said average distance parameter to said average distance wherein when the value of said average distance is less than said minimum average distance, said value of said average distance is set equal to said minimum average distance, and when said value of said average distance is greater than said maximum average distance, said value of said average distance is set equal to said maximum average distance.

11. The method of claim 3 wherein said calculating a predicted registration feature position from the positions of said measured registration features comprises:

(i) manufacturing missing registration feature positions, and (ii) determining said predicted registration feature position from the positions of said measured registration features and said manufactured registration feature positions.

12. The method of claim 3 wherein said defining the position parameter includes determining the number of missing registration features and adjusting said location parameter based on the number of missing registration features.

13. The method of claim 2 wherein said feature parameter is defined in terms of a minimum distance travelled in the process direction.

14. The method of claim 13 wherein the web is elastic and said minimum distance is dependent on the elastic contraction of the web.

15. The method of claim 2 wherein said feature parameter is defined in terms of a maximum distance travelled in the process direction.

16. The method of claim 15 wherein the web is elastic and said maximum distance is dependent on the elastic elongation of the web.

17. The method of claim 2 wherein the step of sensing said web feature further comprises determining the midpoint of the web feature.

18. The method of claim 2 wherein the step of calculating a predicted registration feature position further comprises:

(i) calculating an average distance between the positions of members of said sub-set of registration features; and (ii) determining said predicted position from said average distance.

19. The method of claim 2 wherein the step of calculating a predicted registration feature position further comprises:

(i) manufacturing missing registration feature positions; and (ii) determining said predicted registration feature location from the positions of members of said sub-set of registration features combined with said manufactured registration feature positions.

* * * * *